(No Model.) 2 Sheets—Sheet 1.
C. C. JEROME.
PISTON ROD PACKING.
No. 464,711. Patented Dec. 8, 1891.
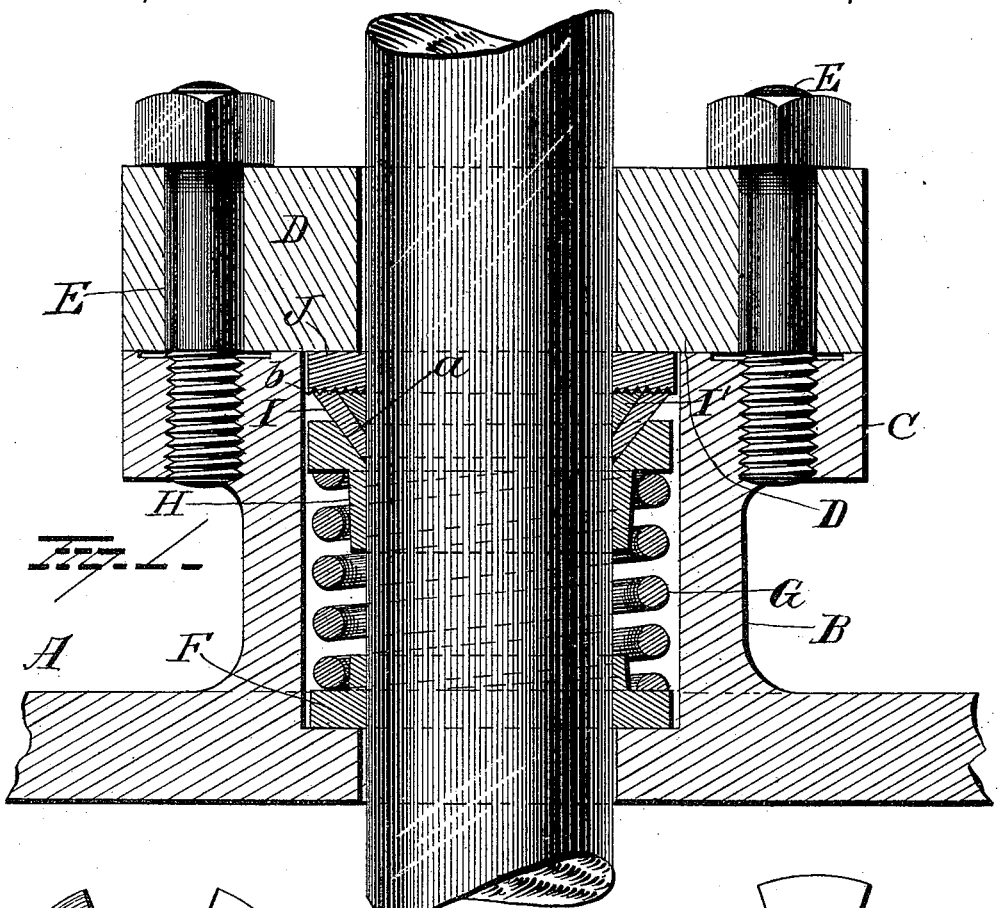
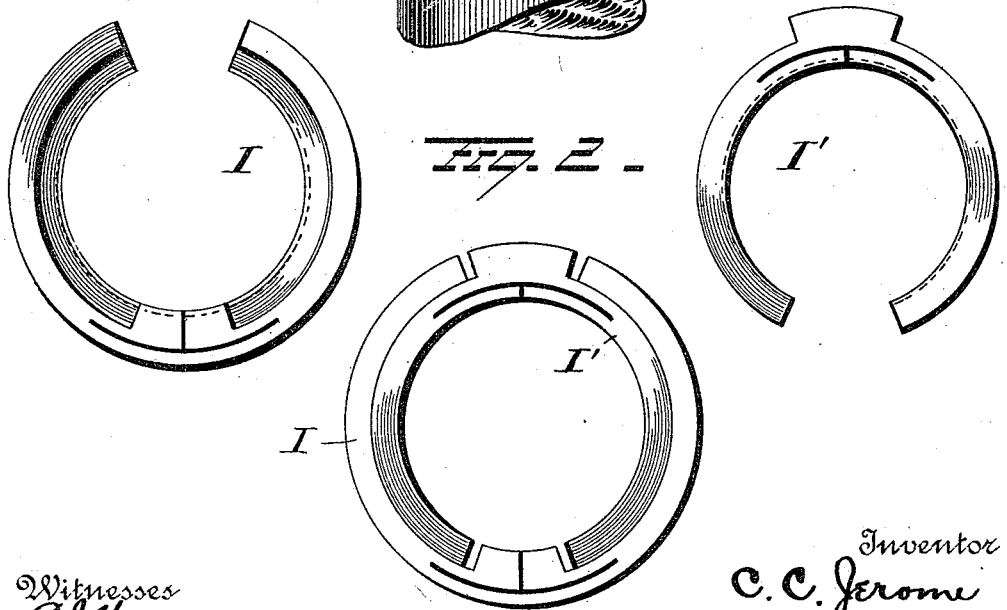
Witnesses
C. J. Attingham
G. F. Downing
Inventor
C. C. Jerome
By H. A. Seymour
Attorney (No Model.) 2 Sheets—Sheet 2.
C. C. JEROME.
PISTON ROD PACKING.
No. 464,711. Patented Dec. 8, 1891.
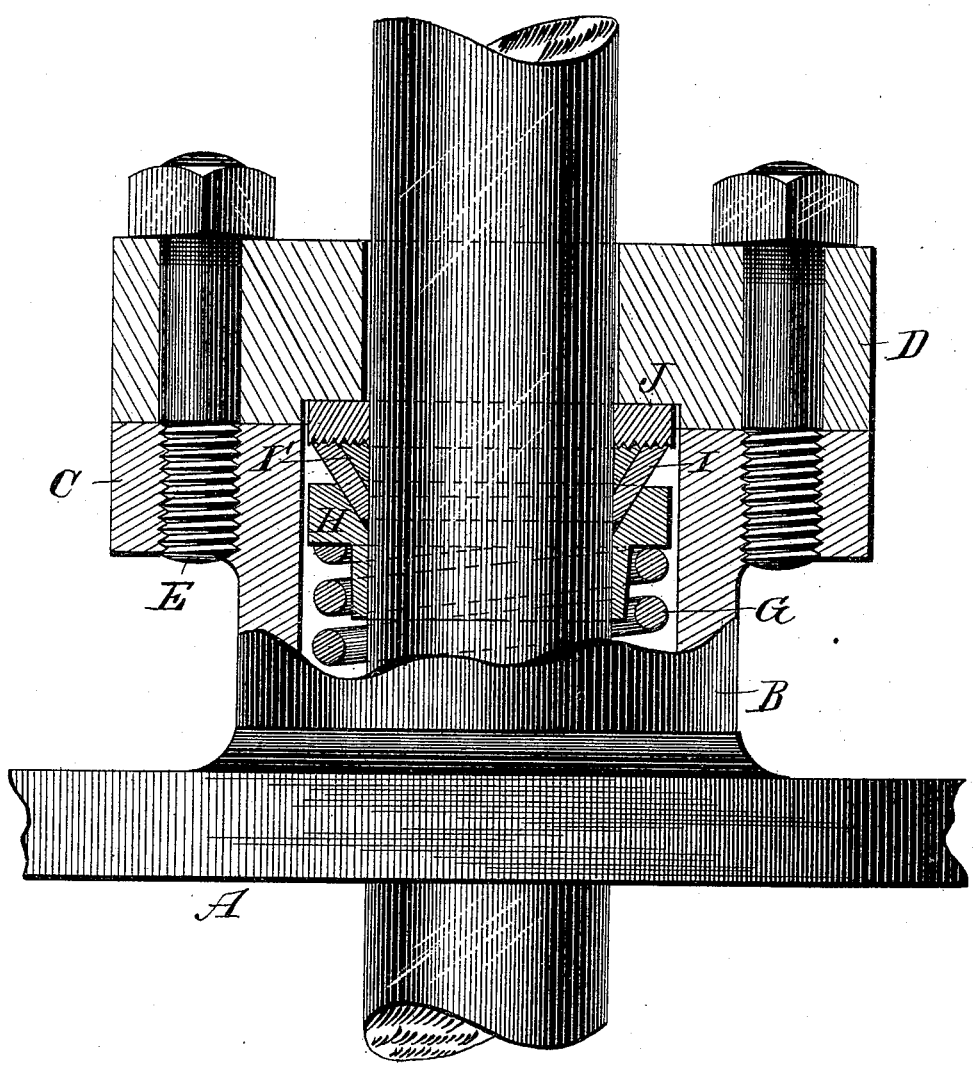
Witnesses
Inventor
C. C. Jerome
By H. A. Seymour
Attorney

UNITED STATES PATENT OFFICE.

CHARLES C. JEROME, OF CHICAGO, ILLINOIS.

PISTON-ROD PACKING.

SPECIFICATION forming part of Letters Patent No. 464,711, dated December 8, 1891.

Application filed May 2, 1891. Serial No. 391,406. (No model.)

*To all whom it may concern:*

Be it known that I, CHARLES C. JEROME, of Chicago, in the county of Cook and State of Illinois, have invented certain new and useful Improvements in Piston-Rod Packings; and I do hereby declare the following to be a full, clear, and exact description of the invention, such as will enable others skilled in the art to which it appertains to make and use the same.

My invention relates to an improvement in piston-rod packings, and is designed more particularly as an improvement on the packing disclosed in Patent No. 266,293, granted to me October 24, 1882.

In Patent No. 266,293 the packing-cone is provided internally with a conical space for a conical packing-ring and with a cylindrical space for a cylindrical packing-ring, the outer edge of the latter being shaped to correspond with the rear face of the follower constructed to bear against the inwardly-projecting sleeve on the gland. In this device all of the parts employed in packing joints are located within the cone and designed to be used in connection with a gland having an inwardly-projecting sleeve.

The object of the present invention is to reduce the number of parts, simplify the construction, and so arrange the parts that they can be used in connection with a gland having an internal projecting sleeve, such as shown in the patent above referred to, or be used in connection with a gland having a plain inner face, such as disclosed in this specification.

With these ends in view my invention consists in the parts and combinations of parts, as will be more fully described, and pointed out in the claims.

In the accompanying drawings, Figure 1 is a view in longitudinal section through a stuffing-box, showing my invention therein. Fig. 2 shows the sectional packing-rings detached, and Fig. 3 is a modified form of gland.

A represents one head of a steam-cylinder, and B the stuffing-box thereon, having an outwardly-projecting flange C formed thereon, upon the outer face of which is seated the gland D, the latter being retained in place by means of the stud-bolts E. The gland D and the head A of the cylinder are each provided with an opening for the passage of the piston-rod, the said openings being slightly greater in diameter than the piston-rod to permit the latter to have a slight vibration.

F is a bushing seated against the head of the cylinder and closely embracing the piston-rod, the external diameter of said bushing being somewhat less than the internal diameter of the stuffing-box, so as to permit the piston to have a slight lateral movement.

Seated on the bushing F is the spiral spring G, which latter encircles the piston-rod and forms a yielding seat or support for the cone H. This cone H closely encircles the piston-rod, so that the rod has no lateral or vibrating movement independent of the cone, and the cone is somewhat less in external diameter than the internal diameter of the stuffing-box, so that it will not interfere in the least with the movements of the piston. The bore of the cone at the inner end thereof is cylindrical and closely embraces the piston-rod, while the outer end or face thereof is provided with a tapering or conical recess *a* for the reception of the packing-rings I I'. The ring I is a beveled split ring shaped to rest solidly against the tapering bore of the cone H, with its inner edge beveled to bear throughout its entire thickness against the piston-rod, while the wedge-shaped split ring I' rests on the outer inclined face or bevel ring and terminates in a plane flush with the outer edge of the beveled ring I, the outer face of the wedge-shaped ring I and the outer edge of the beveled ring fitting snugly against the rear face of the seat-ring or follower J. This ring or follower J closely embraces the piston-rod, and its outer face is ground to form a steam-tight joint with the inner face of the gland. The packing-rings I I' and seat or follower J, while they closely embrace the piston-rod, are smaller in diameter than the internal diameter of the stuffing-box.

The inner or rear face of the seat-ring or follower is provided with a series of concentric grooves or ridges or a series of depressions or ribs of any shape whatever, against which the outer ends of the soft-metal packing-rings rest. The pressure against the rings forces the metal into the grooves or between the ribs or elevations on the seat-ring and operates to form a steam-tight joint, thus avoiding the necessity of grinding or facing the ends or edges of the rings and the inner face of the seat-ring. In addition to forming steam-tight joints, the roughened under surface also prevents the rings from spreading or bulging out at their outer ends.

From the foregoing it will be seen that the piston-rod is not confined in its movements by the contact of the parts of the packing with the stuffing-box, and hence can vibrate without exposing openings through which steam could leak. The spring solidly holds the seat or follower against the gland, and by its pressure on the rings takes up the wear and causes the rings at all times to closely embrace the piston-rod and prevent the escape of steam. Again, by dispensing with the long cone having cylindrical and tapering bores for packing-rings, as disclosed in my former patent, I am enabled to employ much shorter stuffing-boxes.

I have shown the seat-ring or follower bearing against the inner face of the gland flush with the outer edge of the stuffing-box; but it will be seen at a glance that, if desired, I can employ glands having inwardly-projecting sleeves and have the seat-ring or follower bear against the ends of the sleeve. I can also, if desired, recess the inner face of the gland and seat the follower or seat-ring in said recess, as shown in Fig. 3.

It is evident that numerous changes in the details of construction might be resorted to without departing from the spirit and scope of my invention. Hence I would have it understood that I do not confine myself to the exact construction and combinations of parts as herein described.

Having fully described my invention, what I claim as new, and desire to secure by Letters Patent, is—

The combination, with a stuffing-box, gland, and a follower having a roughened inner or rear face, of a cone one face of which is provided with a conical recess and concentric cone-shaped rings extending into this recess, said rings bearing on the rod and follower, substantially as set forth.

In testimony whereof I have signed this specification in the presence of two subscribing witnesses.

CHARLES C. JEROME.

Witnesses:
S. G. NOTTINGHAM,
G. F. DOWNING.